United States Patent
Kaji et al.

(10) Patent No.: US 9,310,108 B2
(45) Date of Patent: *Apr. 12, 2016

(54) MAGNETICALLY REFRIGERATING MAGNETIC MATERIAL, MAGNETIC REFRIGERATION APPARATUS, AND MAGNETIC REFRIGERATION SYSTEM

(75) Inventors: Shiori Kaji, Kanagawa (JP); Akiko Saito, Kanagawa (JP); Tadahiko Kobayashi, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 929 days.

This patent is subject to a terminal disclaimer.

(21) Appl. No.: 12/552,757

(22) Filed: Sep. 2, 2009

(65) Prior Publication Data

US 2010/0058775 A1    Mar. 11, 2010

(30) Foreign Application Priority Data

Sep. 4, 2008 (JP) ................................ 2008-227035

(51) Int. Cl.
*F25B 21/00* (2006.01)
*F25B 21/02* (2006.01)
*H01F 1/01* (2006.01)

(52) U.S. Cl.
CPC .............. *F25B 21/00* (2013.01); *H01F 1/015* (2013.01); *F25B 2321/0022* (2013.01); *Y02B 30/66* (2013.01)

(58) Field of Classification Search
CPC .. F25B 21/00; F25B 2321/0022; H01F 1/015; Y02B 30/66

USPC ............. 62/3.1, 3.4, 3.6; 252/62.51 R, 62.52, 252/62.58

See application file for complete search history.

(56) References Cited

U.S. PATENT DOCUMENTS

| | | | | |
|---|---|---|---|---|
| 4,332,135 A | * | 6/1982 | Barclay et al. | 62/3.1 |
| 4,829,770 A | * | 5/1989 | Hashimoto | 62/3.1 |
| 4,849,017 A | * | 7/1989 | Sahashi et al. | 75/245 |

(Continued)

FOREIGN PATENT DOCUMENTS

| CA | WO 2007048243 A1 | * 5/2007 | F25B 21/00 |
|---|---|---|---|
| JP | 59122872 | 7/1984 | |

(Continued)

OTHER PUBLICATIONS

Japanese Office Action dated Jul. 13, 2010 corresponding to U.S. Appl. No. 12/552,757, filed Sep. 2, 2009.

*Primary Examiner* — Frantz Jules
*Assistant Examiner* — Claire Rojohn, III
(74) *Attorney, Agent, or Firm* — Amin, Turocy & Watson, LLP (57) ABSTRACT

There are provided a magnetic material for magnetic refrigeration improving a magnetic refrigeration efficiency by including a wide operation temperature range and a magnetic refrigeration apparatus and a magnetic refrigeration system using the magnetic material. The magnetically refrigerating magnetic material is formed of a magnetic material shown by a composition formula of $Gd_{100-x-y}Zr_xY_y$, wherein $0<x<3.4$ as well as $0 \le y \le 13.5$, and the magnetic refrigeration apparatus and the magnetic refrigeration system uses the magnetic material. It is preferable that the magnetic material be approximately spherical magnetic particles having a maximum diameter of 0.3 mm or more to 2 mm or less.

14 Claims, 5 Drawing Sheets

(56) References Cited

U.S. PATENT DOCUMENTS

| | | | | |
|---|---|---|---|---|
| 4,985,072 A * | 1/1991 | Sahashi | | B22F 1/025 252/62.55 |
| 5,269,854 A * | 12/1993 | Takahashi et al. | | 148/301 |
| 5,332,029 A * | 7/1994 | Tokai et al. | | 165/4 |
| 5,362,339 A * | 11/1994 | Horimura et al. | | 148/403 |
| 5,381,664 A * | 1/1995 | Bennett et al. | | 62/3.1 |
| 5,447,034 A * | 9/1995 | Kuriyama et al. | | 62/51.1 |
| 5,462,610 A * | 10/1995 | Gschneidner et al. | | 148/301 |
| 5,593,517 A * | 1/1997 | Saito | | B82Y 25/00 148/301 |
| 5,743,095 A * | 4/1998 | Gschneidner et al. | | 62/3.1 |
| 6,022,486 A * | 2/2000 | Tokai et al. | | 252/67 |
| 6,030,468 A * | 2/2000 | Yagi et al. | | 148/301 |
| 6,232,775 B1 * | 5/2001 | Naitoh et al. | | 324/249 |
| 6,334,909 B1 * | 1/2002 | Okamura et al. | | 148/303 |
| 6,336,978 B1 * | 1/2002 | Tokai et al. | | 148/301 |
| 6,363,727 B1 * | 4/2002 | Hashimoto et al. | | 62/6 |
| 6,467,277 B2 * | 10/2002 | Okamura et al. | | 62/6 |
| 6,526,759 B2 * | 3/2003 | Zimm et al. | | 62/3.1 |
| 6,589,366 B1 * | 7/2003 | Gschneidner et al. | | 148/301 |
| 6,676,772 B2 * | 1/2004 | Saito et al. | | 148/301 |
| 6,826,915 B2 * | 12/2004 | Wada et al. | | 62/3.1 |
| 7,063,754 B2 * | 6/2006 | Fukamichi et al. | | 148/301 |
| 7,076,958 B2 * | 7/2006 | Saito et al. | | 62/3.1 |
| 7,076,959 B2 * | 7/2006 | Lewis | | 62/3.1 |
| 7,114,340 B2 * | 10/2006 | Pecharsky et al. | | 62/3.1 |
| 7,536,866 B2 * | 5/2009 | Kobayashi et al. | | 62/3.1 |
| 7,621,046 B2 * | 11/2009 | Lu | | C09K 5/08 29/417 |
| 7,644,588 B2 * | 1/2010 | Shin et al. | | 62/3.1 |
| 7,651,574 B2 * | 1/2010 | Shull et al. | | 148/121 |
| 7,833,361 B2 * | 11/2010 | Saito et al. | | 148/301 |
| 8,037,692 B2 * | 10/2011 | Muller et al. | | 62/3.1 |
| 8,048,236 B2 * | 11/2011 | Shull et al. | | 148/121 |
| 8,061,147 B2 * | 11/2011 | Dinesen et al. | | 62/3.1 |
| 8,109,100 B2 * | 2/2012 | Sandeman et al. | | 62/3.1 |
| 2003/0051774 A1 * | 3/2003 | Saito et al. | | 148/302 |
| 2003/0085375 A1 * | 5/2003 | Schubring et al. | | 252/62.51 R |
| 2004/0079446 A1 * | 4/2004 | Kogure et al. | | 148/101 |
| 2004/0093877 A1 * | 5/2004 | Wada et al. | | 62/114 |
| 2004/0194855 A1 * | 10/2004 | Fukamichi et al. | | 148/105 |
| 2004/0231338 A1 * | 11/2004 | Saito et al. | | 62/3.1 |
| 2005/0000230 A1 * | 1/2005 | Saito et al. | | 62/3.1 |
| 2005/0255236 A1 * | 11/2005 | Deng et al. | | 427/180 |
| 2006/0144473 A1 * | 7/2006 | Shull et al. | | 148/121 |
| 2006/0218936 A1 | 10/2006 | Kobayashi et al. | | |
| 2006/0254385 A1 * | 11/2006 | Tsuji et al. | | 75/244 |
| 2007/0220901 A1 * | 9/2007 | Kobayashi et al. | | 62/3.1 |
| 2007/0241305 A1 * | 10/2007 | Sakurada et al. | | 252/62.57 |
| 2008/0078476 A1 * | 4/2008 | Saito et al. | | 148/328 |
| 2008/0216484 A1 * | 9/2008 | Tsuji et al. | | 62/3.3 |
| 2008/0236171 A1 * | 10/2008 | Saito et al. | | 62/3.1 |
| 2009/0113897 A1 * | 5/2009 | Dinesen et al. | | 62/3.1 |
| 2009/0217674 A1 * | 9/2009 | Kaji et al. | | 62/3.1 |
| 2010/0058775 A1 * | 3/2010 | Kaji et al. | | 62/3.1 |
| 2010/0184179 A1 * | 7/2010 | Rondinone et al. | | 435/168 |
| 2010/0276627 A1 * | 11/2010 | Mazet | | 252/62.55 |
| 2010/0301257 A1 * | 12/2010 | Modahl et al. | | 252/62.54 |
| 2011/0020661 A1 * | 1/2011 | Waeckerle et al. | | 428/546 |
| 2011/0048031 A1 * | 3/2011 | Barve et al. | | 62/3.1 |
| 2011/0094243 A1 * | 4/2011 | Carroll et al. | | 62/3.1 |
| 2011/0154832 A1 * | 6/2011 | Barve et al. | | 62/3.1 |
| 2011/0168363 A9 * | 7/2011 | Reppel et al. | | 165/133 |
| 2011/0173993 A1 * | 7/2011 | Muller et al. | | 62/3.1 |
| 2012/0021222 A1 * | 1/2012 | Lian et al. | | 428/403 |
| 2012/0031108 A1 * | 2/2012 | Kobayashi et al. | | 62/3.1 |
| 2012/0073307 A1 * | 3/2012 | Kaji et al. | | 62/3.1 |
| 2012/0079834 A1 * | 4/2012 | Dinesen et al. | | 62/3.1 |

FOREIGN PATENT DOCUMENTS

| | | |
|---|---|---|
| JP | 03177083 | 8/1991 |
| JP | 04186802 | 7/1992 |
| JP | 2006512556 | 4/2006 |
| JP | 2006283987 | 10/2006 |
| JP | 2007132655 | 5/2007 |

* cited by examiner

MAGNETICALLY REFRIGERATING MAGNETIC MATERIAL, MAGNETIC REFRIGERATION APPARATUS, AND MAGNETIC REFRIGERATION SYSTEM

CROSS-REFERENCE TO RELATED APPLICATION

This application is based upon and claims the benefit of priority from Japanese Patent Applications No. 2008-227035, filed on Sep. 4, 2008, the entire contents of which are incorporated herein by reference.

FIELD OF THE INVENTION

The present invention relates to a magnetic material having a magnetocaloric effect, a magnetic refrigeration apparatus using the magnetic material and a magnetic refrigeration system.

BACKGROUND OF THE INVENTION

At present, almost all refrigeration technologies in a room temperature region, which closely relates to a human daily life, for example, a refrigerator, a freezing chamber, a room heating/cooling system, and the like, mostly employ gas compression/expansion cycle. However, the refrigeration technologies based on the gas compression/expansion cycle have a serious problem of an environmental destruction due to specific freon gas discharged into the environment. Further, as to alternative freon gas, its adverse affects on the environment are also concerned. From the above background, practically use of a safe, clean, and effective refrigeration technology which does not cause a problem of the environmental destruction even if a working gas is discarded is required, as found in an examination of natural refrigerants such as $CO_2$, ammonia, and the like, and isobutene which have a smaller risk to the environment.

Thus expectations are raised for a magnetic refrigeration as one of environment-conscious and effective refrigeration technologies. Then, research and development of a magnetic refrigeration technology aiming at a room temperature range are accelerated. The magnetic refrigeration technology uses a magnetocaloric effect that Warburg discovered on iron (Fe) in 1881. The magnetocaloric effect is a phenomenon that the temperature of magnetic material changes according to changing of external magnetic field in an adiabatic state. In early 1900's, the refrigeration system using paramagnetic salts and compounds represented by $Gd_2(SO_4)_3 \cdot 8H_2O$ or $Gd_3Ga_5O_{12}$, which show the magnetocaloric effect, was developed. However that system was mainly used in an ultra-cold temperature region around 20 K or less, and needed a high magnetic field around 10 T which is created by a superconducting magnet.

Researches for making use of a magnetic transition between a paramagnetic state and a ferromagnetic state have been vigorously carried out from the 1970s' up to now to realize a magnetic refrigeration in a high temperature region. As a result of these researches, some magnetic materials are proposed. For example, a simple substance of rare earth (Pr, Nd, Dy, Er, Tm, Gd and the like), rare earth alloys which include at least two kinds of rare earth element, such as Gd—Y, Gd—Dy, and intermetallic compounds such as $RAl_2$ and $RNi_2$ (R represents rare earth elements), GdPd, and the like.

In 1982, Barclay proposed an AMR ("Active Magnetic Regenerative Refrigeration") system as a magnetic refrigeration system for a room temperature region in the United States. The key feature of this system is to use the two effects, a magnetocaloric effect and a heat accumulation, of magnetic materials (refer to U.S. Pat. No. 4,332,135). That is, this system actively uses the lattice entropy which was conventionally considered as a disincentive.

In United States in 1998, Zimm, Gschneidner, Pecharsky et al succeeded in a continuous operation of a magnetic refrigeration cycle by using AMR systems with Gd (gadolinium) under the high magnetic field (5 T) generated by a superconducting magnet.

Magnetic refrigeration is carried out by the AMR system using the following steps:

(1) A magnetic field is applied to a magnetic refrigeration working material;

(2) The magnetic refrigeration working material heat up at step (1) and this heat energy is transported to one side by a heat transfer fluid;

(3) The magnetic field removed; and (4) The magnetic refrigeration working materials cool down at step (3) and this coldness is transported to the other side by a heat transfer fluid.

Repeating the cycle from (1) to (4), the heat energy generated by magnetic refrigeration material is transported to one direction and then the temperature gradient is created in AMR bed. As a result, a refrigeration work is carried out by generating a large temperature difference.

However, a magnetocaloric effect of the magnetic refrigeration material is maximized in the vicinity of a magnetic transition temperature and reduced as a temperature is away from the magnetic transition temperature. Accordingly, there is a problem in that a job efficiency is deteriorated. To cope with the above problem, there is proposed to increase a working temperature region by filling an AMR bed with magnetic materials having a different magnetic transition temperature in a layered state in agreement with a temperature difference generated in the AMR bed (refer to JP-A H04-186802 (KOKAI)

SUMMARY OF THE INVENTION

A magnetic material for magnetic refrigeration of an embodiment of the present invention has a magnetic material shown by a composition formula of $Gd_{100-x-y}Zr_xY_y$, wherein 0 (at %)<x<3.4 (at %) and 0 (at %)≤y≤13.5 (at %).

A magnetic refrigeration apparatus of an embodiment of the present invention using a heat transfer fluid has an AMR bed filled with a magnetic material, a magnetic field generation device configured to apply and remove a magnetic field to and from the magnetic material, a low temperature side heat exchanging unit configured to receive coldness from the AMR bed, a high temperature side heat exchanging unit configured to receive heat from the AMR bed, and a heat transfer fluid path formed by connecting the AMR bed, the low temperature side heat exchanging unit, and the high temperature side heat exchanging unit for circulating a heat transfer fluid, wherein at least a part of the magnetic material is formed of a magnetic material shown by a composition formula of $Gd_{100-x-y}Zr_xY_y$, wherein 0<x<3.4 and 0≤y≤13.5.

A magnetic refrigeration system of an embodiment of the present invention has a magnetic refrigeration apparatus having an AMR bed filled with a magnetic material, a magnetic field generation device configured to apply and remove a magnetic field to and from the magnetic material, a low temperature side heat exchanging unit, a high temperature side heat exchanging unit, and a heat transfer fluid path formed by connecting the AMR bed, the low temperature side heat exchanging unit, and the high temperature side heat exchanging unit for circulating a heat transfer fluid, wherein at least a part of the magnetic material is formed of a magnetic material shown by a composition formula of $Gd_{100-x-y}Zr_xY_y$, wherein $0<x<3.4$ and $0\leq y\leq 13.5$, a cooling unit thermally connected to the low temperature side heat exchanging unit, and a heat discharge unit thermally connected to the high temperature side heat exchanging unit.

DETAILED DESCRIPTION OF THE EMBODIMENTS

The inventors have found that when a small amount of Zr is solid-dissolved in Gd, a decrease of an amount of change of magnetic entropy ($\Delta S$) caused by deviation from a ferromagnetic transition temperature (hereinafter, also shown as $T_c$) can be suppressed. As a result a magnetic material whose magnetically refrigerating operation temperature region is expanded can be created. A magnetic material for magnetic refrigeration, a magnetic refrigeration apparatus, and a magnetic refrigeration system of embodiments of the present invention based on the knowledge found by the inventors will be described below with reference to the drawings.

First Embodiment

A magnetic material for magnetic refrigeration of a first embodiment is formed by a magnetic material shown by a composition formula of $Gd_{100-x-y}Zr_xY_y$. The magnetic material has a feature in that $0<x<3.4$, $0\leq y\leq 13.5$. Here, 100-x-y, x, and y show an atomic weight ratio.

Figure 1:
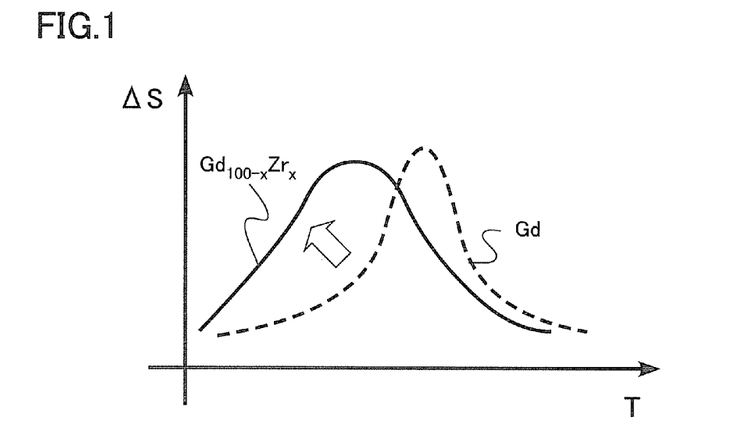
FIG. 1 is an explanatory view of an operation of a magnetic material of a first embodiment.

The magnetic material of the first embodiment is a magnetic material in which Zr is solid-dissolved in Gd in an amount of, for example, less than 3.4 at %. FIG. 1 is an explanatory view of an operation of the magnetic material of the first embodiment. In FIG. 1, a lateral axis shows a temperature, and a vertical axis shows an amount of change of magnetic entropy ($\Delta S$).

Comparing a $\Delta S$ curve of Gd (dotted line) with that of $Gd_{100-x}Zr_x$ (solid line), a decrease of $\Delta S$ is suppressed when a temperature is deviated from a ferromagnetic transition temperature that shows a maximum peak of the curve in $Gd_{100-x}Zr_x$. Accordingly, the magnetic material can expand the magnetically refrigerating operation temperature region.

The expansion of the magnetically refrigerating operation temperature region of the magnetic material as described above is useful not only when the magnetic material is used as a stand-alone but also when a plurality of magnetic materials are used in combination. This is because it is possible to effectively operate a refrigerating cycle and to reduce the kinds of magnetic materials to be combined.

Note that a reason why the atomic weight ratio of Zr in the magnetic material is set to 0 (at %)<x<3.4 (at %) lies in that the solid dissolution limit of Zr in Gd is 3.4 (at %) and the effect is confirmed in the range. Further, a more free design is possible by combining Y which is soluble in all proportion in Gd. Further, a reason why the atomic weight ratio of Y in the magnetic material is set to 0 (at %)≤y≤13.5 (at %) lies in that a suppression effect to the decrease of $\Delta S$ due to the deviation from ferromagnetic transition temperature can be obtained even if Y is not contained and that when the range is exceed, the decrease of the value $\Delta S$ itself due to a decrease of magnetization is not negligible.

Further, according to the first embodiment, the magnetically refrigerating operation temperature region can be expanded by adding Zr, which is cheaper than Y, to Gd. Accordingly, it is possible to provide a magnetic material having a wide magnetically refrigerating operation temperature region at a reasonable cost.

Further, the magnetically refrigerating magnetic material is preferably a number of substantially spherical magnetic particles. Further, the magnetic particles preferably have a maximum diameter of from 0.3 mm or more to 2 mm or less. The maximum diameter of the magnetic particles can be evaluated by visually measuring it using calipers and the like, directly observing it under a microscope, or measuring it using a microscopic photograph. It is important that the heat exchange between a magnetic material filled in an AMR bed and a liquid refrigerant (heat transfer fluid) works sufficiently to realize a high refrigeration capability of a magnetic refrigeration apparatus uses the liquid refrigerant.

Then, it is necessary to secure a flow path of the liquid refrigerant while keeping a high filling ratio of the magnetic material so that the heat is sufficiently exchanged between the magnetic material and the liquid refrigerant. For this purpose, the magnetic material is preferably substantially spherical. Further, although it is preferable to increase the specific surface area of the magnetic particles by reducing the particle diameter thereof, when the particle diameter is too small, the pressure loss of the refrigerant is increased. Accordingly, the maximum diameter of the magnetic particles of the first embodiment is set to 0.3 mm or more to 2 mm or less to keep a good heat exchange efficiency while reducing the pressure loss.

In the magnetically refrigerating magnetic material of the first embodiment, a reason why the decrease of $\Delta S$ due to deviate from the ferromagnetic transition temperature can be suppressed by solid-dissolving the small amount of Zr in Gd is as described below.

That is, it is known that Gd shows the spin-reorientation at a temperature lower than the ferromagnetic transition temperature. Hereinafter, the temperature at which the spin-reorientation occurs is called spin-reorientation temperature ($T_{SR}$). It is considered that the spin-reorientation temperature can be increased by a change in an electronic state caused by lattice constant change or an element replacement.

The inventors have confirmed that the addition of a small amount of Zr to Gd decreases the ferromagnetic transition temperature and increases the spin-reorientation temperature.

It is considered that when temperatures of two peculiar points at which the spin structure is changed, i.e., the temperatures $T_C$ and $T_{SR}$, are approached, even if the temperature is deviated from the ferromagnetic transition temperature ($T_C$), the decrease of the amount of change of the magnetic entropy ($\Delta S$) can be suppressed by the contribution of the change of the magnetic entropy due to the spin-reorientation.

Second Embodiment

A magnetic refrigeration apparatus according to a second embodiment of the present invention is a magnetic refrigeration apparatus of an AMR system using a liquid refrigerant (heat transfer fluid). The magnetic refrigeration apparatus includes an AMR bed filled with a magnetic material, a magnetic field generation device for applying and removing a magnetic field to and from the magnetic material, a low temperature side heat exchanging unit, and a high temperature side heat exchanging unit. Further, the magnetic refrigeration apparatus includes a refrigerant flow path (heat transfer fluid flow path) which is formed by connecting the AMR bed, the low temperature side heat exchanging unit, and the high temperature side heat exchanging unit and circulates the liquid refrigerant (heat transfer fluid). Then, it is a feature of the second embodiment that the magnetic material filled in the AMR bed is the magnetic material of the first embodiment. Description of the contents of the magnetic material which overlap those of the first embodiment is omitted.

Figure 2:
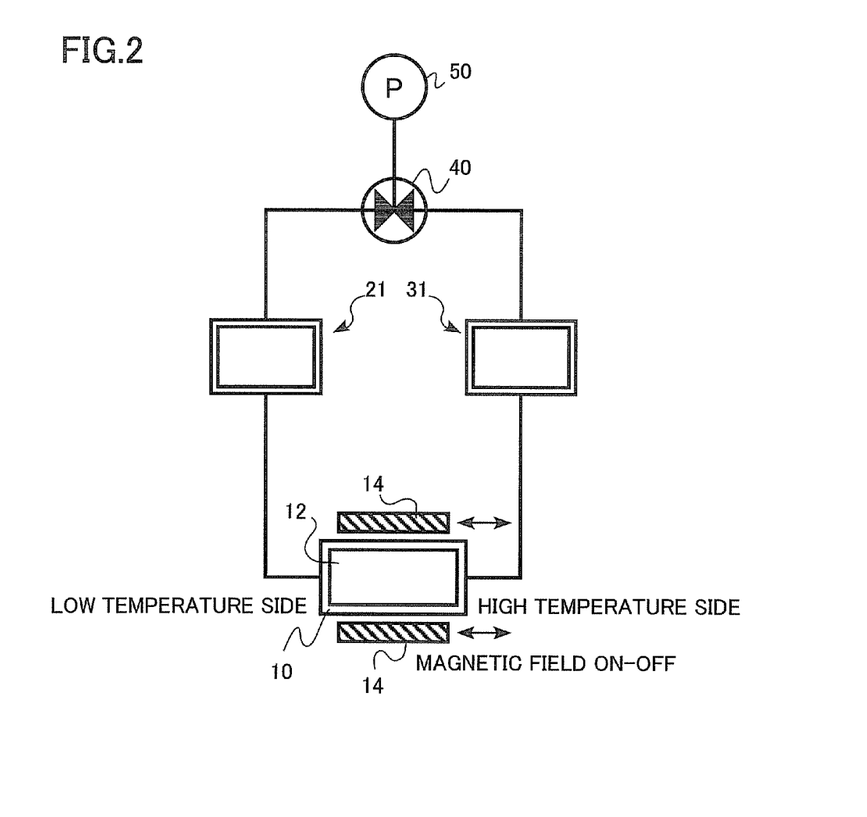
FIG. 2 is a sectional view of a schematic structure of a magnetic refrigeration apparatus of a second embodiment.

FIG. 2 is a sectional view of a schematic structure of the magnetic refrigeration apparatus of the second embodiment.

The magnetic refrigeration apparatus uses, for example, water as the liquid refrigerant. The low temperature side heat exchanging unit 21 is disposed to a low temperature end side of the AMR bed 10, and the high temperature side heat exchanging unit 31 is disposed to a high temperature end side of the same.

Then, a switching means 40, which switches a refrigerant flow direction, is interposed between the low temperature side heat exchanging unit 21 and the high temperature side heat exchanging unit 31. Further, a refrigerant pump 50 as a refrigerant transport means is connected to the switching means 40. Then, the AMR bed 10, the low temperature side heat exchanging unit 21, the switching means 40, and the high temperature side heat exchanging unit 31 are connected to each other through a pipe to thereby form a refrigerant flow path for circulating the liquid refrigerant.

The AMR bed 10 is filled with the magnetic material 12 with the magnetocaloric effect described in the first embodiment. A horizontally movable permanent magnet 14 is disposed to the outside of the AMR bed 10 as a magnetic field generation device.

Next, an operation of the magnetic refrigeration apparatus of the second embodiment will be briefly described with reference to FIG. 2. When the permanent magnet 14 is disposed to a position confronting the AMR bed 10 (position shown in FIG. 2), it applies a magnetic field to the magnetic material 12 in the AMR bed 10. Therefore, the magnetic material 12 having the magnetocaloric effect generates heat. At the time, the liquid refrigerant is circulated by the operations of the refrigerant pump 50 and the switching means 40 in a direction from the AMR bed 10 to the high temperature side heat exchanging unit 31. Heat is transported to the high temperature side heat exchanging unit 31 by the liquid refrigerant whose temperature is increased by the heat generated by the magnetic material 12.

Thereafter, the permanent magnet 14 is moved from the position confronting the AMR bed 10, and the magnetic field applied to the magnetic material 12 is removed. The magnetic material 12 absorbs heat by removing the magnetic field. At the time, the liquid refrigerant is circulated by the operations of the refrigerant pump 50 and the switching means 40 in a direction from the AMR bed 10 to the low temperature side heat exchanging unit 21. Coldness is transported to the low temperature side heat exchanging unit 21 by the liquid refrigerant cooled by the heat absorption of the magnetic material 12.

A temperature gradient is made to the magnetic material 12 in the AMR bed 10 by repeating application and removal of the magnetic field to and from the magnetic material 12 in the AMR bed 10 by repeating the movement of the permanent magnet 14. Then, the low temperature side heat exchanging unit 21 is continuously cooled by moving the liquid refrigerant in synchronization with the application and the removal of the magnetic field.

The magnetic refrigeration apparatus of the second embodiment can realize a high heat exchange efficiency by using the magnetic material having the increased magnetic refrigeration operation temperature.

Note that, in the second embodiment, as to the magnetic material 12 in the AMR bed 10, one kind of a magnetic material having the same composition is not always uniformly filled and a magnetic material having two or more kinds of compositions may be filled.

Figure 3:
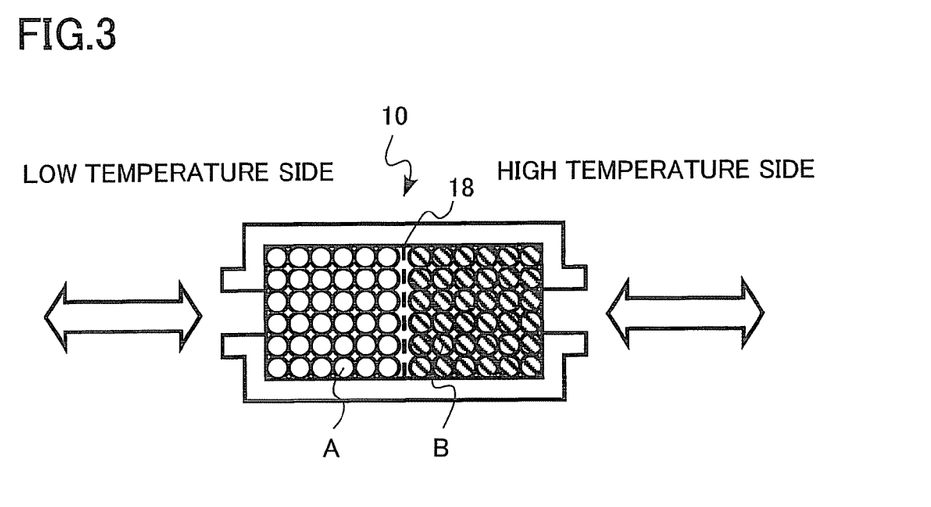
FIG. 3 is a sectional view showing an arrangement of a magnetic material in an AMR bed of the second embodiment.

It is preferable that the magnetic material includes, for example, the magnetically refrigerating magnetic material described in the first embodiment and a magnetically refrigerating magnetic material having at least one kind of other composition and the AMR bed is filled with the former magnetic material and the latter magnetic material formed in a layered state. FIG. 3 is a sectional view showing an arrangement of the magnetic material in the AMR bed of the second embodiment.

As shown in FIG. 3, the low temperature end side of the AMR bed 10 is filled with magnetic particles A of an alloy of the first embodiment containing Gd and a small amount of Zr. Then, the high temperature end side of the AMR bed 10 is filled with magnetic particles B, for example, magnetic particles of Gd having a ferromagnetic transition temperature higher than that of the magnetic particles A. The magnetic material on the low temperature end side and the magnetic material on the high temperature end side are separated from each other by, for example, a lattice-shaped partition wall 18, through which the refrigerant can pass, and filled in a layered state so that they are not mixed with each other. Further, openings are formed to both the ends of the AMR bed 10 to flow the refrigerant in both the right and left directions in the AMR bed 10.

A magnetic refrigeration apparatus, which further increases the magnetic refrigeration operation temperature and realizes a higher heat exchange efficiency, can be provided by employing the arrangement of the magnetic material in the AMR bed shown in FIG. 3. FIG. 3 shows a two-layered structure of the magnetic material in the AMR bed. However, it is also possible to further increase the magnetic refrigeration operation temperature and to realize higher heat exchange efficiency by employing multi-layered structure with more than three layers.

Figure 4:
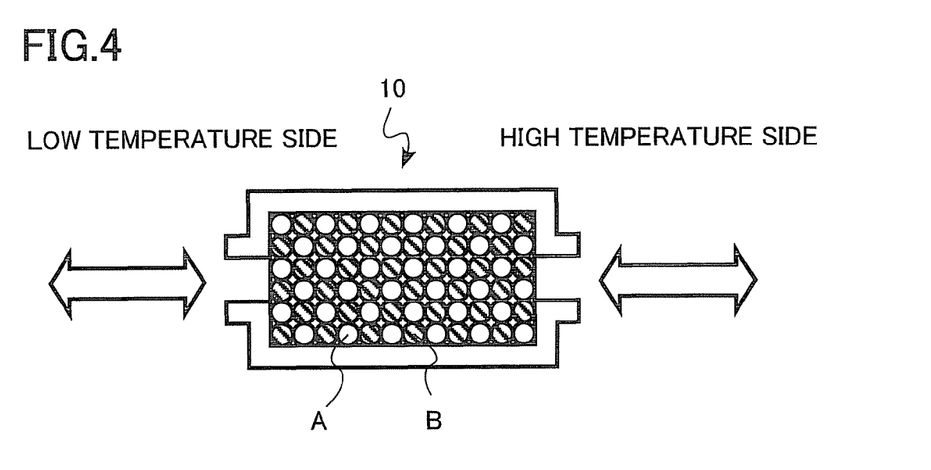
FIG. 4 is a sectional view showing another arrangement of the magnetic material in the AMR bed of the second embodiment.

Further, it is preferable, for example, that the magnetic material contains the magnetic material described in the first embodiment and the magnetic material including at least one kind of the other composition and that the former magnetic material and the latter magnetic material are filled in the AMR bed in a mixed state. FIG. 4 is a sectional view showing another arrangement of the magnetic material in the AMR bed.

As shown in FIG. 4, the AMR bed 10 is filled with the magnetic particles A of the alloy which is composed of Gd containing the small amount of Zr and the magnetic particles B, for example, the magnetic particles having the magnetic transition temperature higher (or lower) than that of the magnetic particles A of the first embodiment in a mixed state.

A magnetic refrigeration apparatus, which further increases a magnetic refrigeration operation temperature and realizes a higher heat exchange efficiency, can be provided by employing the arrangement of the magnetic material in the AMR bed shown in FIG. 4. Although FIG. 4 shows that the two kinds of the particles are mixed as the magnetic material in the AMR bed, it is also possible to further increase the magnetic refrigeration operation temperature and to realize higher heat exchange efficiency by mixing more than two kinds of magnetic materials.

Third Embodiment

A magnetic refrigeration system of a third embodiment of the present invention has a feature in that it includes the magnetic refrigeration apparatus described in the second embodiment, a cooling unit thermally connected to a low temperature side heat exchanging unit, and a heat discharge unit thermally connected to a high temperature side heat exchanging unit. In the following description, the contents that overlap those described in the second embodiment will not be repeated.

Figure 5:
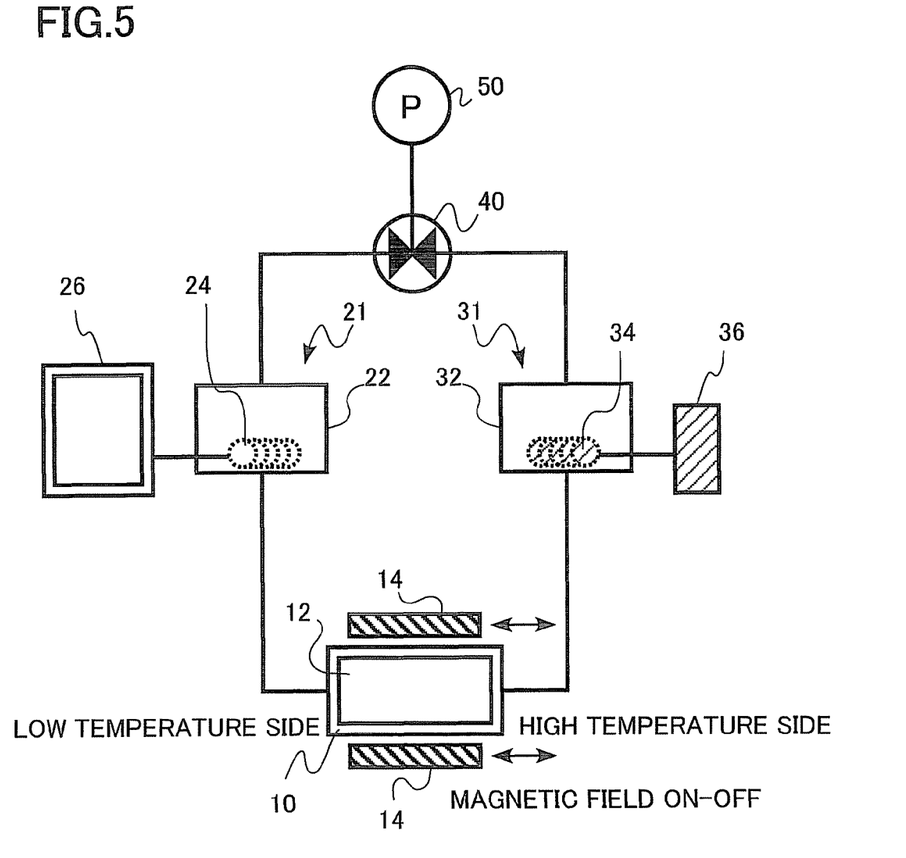
FIG. 5 is a sectional view of a schematic structure of a magnetic refrigeration system of a third embodiment.

FIG. 5 is a sectional view of a schematic structure of the magnetic refrigeration system of the third embodiment. The magnetic refrigeration system includes the cooling unit 26 thermally connected to the low temperature side heat exchanging unit 21 and the heat discharge unit 36 thermally connected to the high temperature side heat exchanging unit 31.

The low temperature side heat exchanging unit 21 is composed of a low temperature bath 22 for storing a low temperature refrigerant and a low temperature side heat exchanger 24 disposed in the low temperature side bath 22 so as to be in contact with the refrigerant. Likewise, the high temperature side heat exchanging unit 31 is composed of a high temperature bath 32 for storing a high temperature refrigerant and a high temperature side heat exchanger 34 disposed in high temperature bath 32 so as to be in contact with the refrigerant. Then, the cooling unit 26 is thermally connected to the low temperature side heat exchanger 24, and the heat discharge unit 36 is thermally connected to the high temperature side heat exchanger 34.

The magnetic refrigeration system can be applied to, for example, a home refrigerator. In this case, the cooling unit 26 is a freezing/refrigerating chamber as a target to be cooled, and the heat discharge unit 36 is, for example, a radiation plate.

Notwithstanding the above description, the magnetic refrigeration system is not particularly restricted thereto. More specifically, the magnetic refrigeration system can be also applied to a refrigeration system of, for example, a home refrigerator-freezer, a home air conditioner, an industrial refrigerator-freezer, a large refrigerated/frozen warehouse, a liquefied gas storage/transport frozen chamber, and the like in addition to the home refrigerator-freezer described above. The magnetic refrigeration system has a different freezing capability and a different control temperature region required thereto depending on a location in which it is applied. However, the freezing capability can be changed by changing the amount of use of the magnetic particles. Further, the control temperature region can be caused to agree with a specific temperature region because a magnetic transition temperature can be changed by controlling the material of the magnetic particles. Further, the magnetic refrigeration system can be also applied to an air conditioning system such as a home air conditioner, an industrial air conditioner, and the like which make use of the heat discharged from the magnetic refrigeration apparatus for space heating. The magnetic refrigeration system may be applied to a plant making use of both cooling and heat generation.

A magnetic refrigeration system, which improves a magnetic refrigeration efficiency, can be realized by the magnetic refrigeration system of the third embodiment.

The embodiments of the present invention have been described above referring to the specific examples. The embodiments are raised as only examples and by no means restrict the present invention. Further, in the description of the embodiments, description of the portions and the like of the magnetically refrigerating magnetic material, the magnetic refrigeration apparatus, the magnetic refrigeration system, and the like, which do not directly relate to the explanation of the present invention, is omitted. However, the elements, which relate to a necessary magnetically refrigerating magnetic material, magnetic refrigeration apparatus, magnetic refrigeration system, and the like, can be appropriately selected and used.

In addition to the above, all the magnetically refrigerating magnetic materials, magnetic refrigeration apparatus, and magnetic refrigeration systems, which include the elements of the present invention and the design of which can be appropriately modified by the persons skilled in the art, are included within the scope of the present invention. The scope of the present invention is defined by the scope of claims and the scope of the equivalents of the claims.

Examples

Examples of the present invention will be described below in detail.

Example 1

A magnetic material, which is shown by a composition formula of $Gd_{99.8}Zr_{0.2}$, was created. The magnetic material having the above composition was adjusted and then made to an alloy by being melted by an arc. At the time, the magnetic material was repeatedly melted by being reversed several times to enhance the homogeneity thereof.

The amount of change of entropy of a magnetic spin system of the magnetic material, i.e., the amount of change of magnetic entropy ($\Delta S$ (T, $\Delta H_{ext}$)) thereof when an externally applied magnetic field was changed was determined from magnetization measurement data. $\Delta S$ was calculated by the following equation.

$$\Delta S(T, \Delta H_{ext}) = \int_0^{H_{ext}} \frac{\partial M}{\partial T} dH_{ext}$$

where, T shows a temperature, $H_{ext}$ shows an externally applied magnetic field, and M shows magnetization. In the example, when the magnetization was measured, the externally applied magnetic field $H_{ext}$ was changed from 0 to 800000 A/m (10 kOe). That is, the change of magnetic field $\Delta H_{ext}$ was set to $\Delta H_{ext}$=800000 A/m. The temperature was measured in the range of from 265K to 315K.

The temperature, at which a maximum peak appeared to the change of amount of magnetic entropy $\Delta S$, was shown by $T_{peak}$. Further, the absolute value of $\Delta S$ at $T_{peak}$ was shown by $\Delta S_{max}$.

Then, the temperature region, which had a value of $1/2\Delta S_{max}$ that was a half value of $\Delta S_{max}$, was determined. Table 1 shows a result of measurement.

Further, the temperature dependence of a magnetization curve was measured. More specifically, the temperature dependence of M/M(200K), which was magnetization (M) normalized by magnetization of 200K (M (200K)) was evaluated. A temperature range was measured in the range of from 200K to 320K. The externally applied magnetic field $H_{ext}$ was measured at 8000 A/m (1000e). In two peculiar points at which the inclination of the magnetization curve was changed, the temperature of one peculiar point, which was caused by a ferromagnetic transition, was shown by $T_C$, and the temperature of the other peculiar point, which was considered to be caused by spin-reorientation, was shown by $T_{SR}$. Table 2 shows a result of measurement.

Example 2

In an example 2, a magnetic material was created likewise the example 1 except that it had a composition formula of $Gd_{99.5}Zr_{0.5}$. As to the magnetic material, the temperature dependence of a magnetization curve was measured. Table 2 shows a result of measurement.

Example 3

Figure 6:
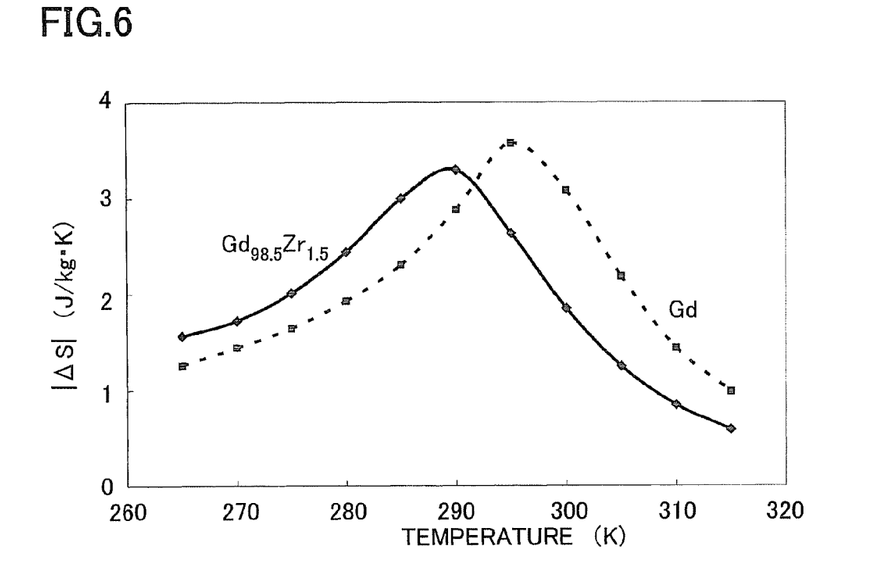
FIG. 6 is a view showing the temperature dependence of the amounts of change of magnetic entropy $\Delta S$ of an example 3 and a comparative example 1.
Figure 7:
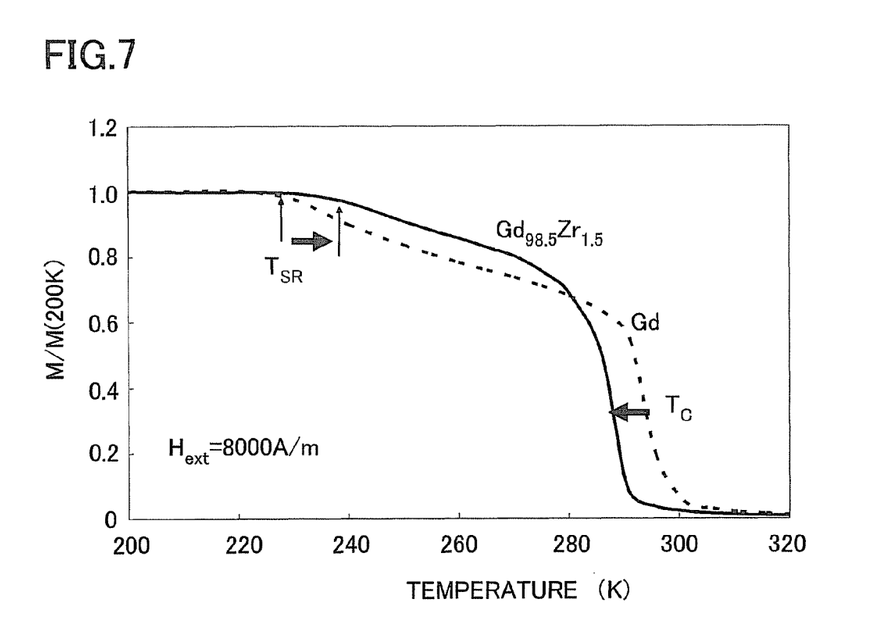
FIG. 7 is a view showing the temperature dependence of the magnetization curves of the example 3 and the comparative example 1.

In an example 3, a magnetic material was created likewise the example 1 except that it had a composition formula of $Gd_{98.5}Zr_{1.5}$. As to the magnetic material, the amount of change of magnetic entropy $\Delta S$ was evaluated. Table 1 and FIG. 6 show a result of measurement. Further, the temperature dependence of a magnetization curve was measured. Table 2 and FIG. 7 show a result of measurement.

Example 4

In an example 4, a magnetic material was created likewise the example 1 except that it had a composition formula of $Gd_{97}Zr_3$. As to the magnetic material, the amount of change of magnetic entropy $\Delta S$ was evaluated. Table 1 shows a result of measurement. Further, the temperature dependence of a magnetization curve was measured. Tables 2 and 3 show a result of measurement.

Example 5

In an example 5, a magnetic material was created likewise the example 1 except that it had a composition formula of $Gd_{93}Y_{5.5}Zr_{1.5}$. As to the magnetic material, the amount of change of magnetic entropy $\Delta S$ was evaluated. Table 1 shows a result of measurement. Further, the temperature dependence of a magnetization curve was measured. Table 3 shows a result of measurement.

Example 6

In an example 6, a magnetic material was created likewise the example 1 except that it had a composition formula of $Gd_{85}Y_{13.5}Zr_{1.5}$. As to the magnetic material, the temperature dependence of a magnetization curve was measured. Table 3 shows a result of measurement.

Example 7

In an example 7, a magnetic material was created likewise the example 1 except that it had a composition formula of $Gd_{93}Y_4Zr_3$. As to the magnetic material, the amount of change of magnetic entropy $\Delta S$ was evaluated. Table 1 shows a result of measurement. Further, the temperature dependence of a magnetization curve was measured. Table 3 shows a result of measurement.

Example 8

In an example 8, a magnetic material was created likewise the example 1 except that it had a composition formula of $Gd_{85}Y_{12}Zr_3$. As to the magnetic material, the amount of change of magnetic entropy $\Delta S$ was evaluated. Table 1 shows a result of measurement.

Example 9

In an example 9, a magnetic material was created likewise the example 1 except that it had a composition formula of $Gd_{97}Y_{1.5}Zr_{1.5}$. As to the magnetic material, the temperature dependence of a magnetization curve was measured. Table 3 shows a result of measurement.

Comparative Example 1

The amount of change of magnetic entropy $\Delta S$ of Gd was evaluated. Table 1 and FIG. 6 show a result of measurement. Further, the temperature dependence of a magnetization curve was measured. Table 2 and FIG. 7 show a result of measurement.

Comparative Example 2

In a comparative example 2, a magnetic material was created likewise the example 1 except that it had a composition formula of $Gd_{90}Y_{10}$. As to the magnetic material, the amount of change of magnetic entropy $\Delta S$ was evaluated. Further, the temperature dependence of a magnetization curve was measured. Table 2 shows a result of measurement.

Comparative Example 3

In a comparative example 3, a magnetic material was created likewise the example 1 except that it had a composition formula of $Gd_{70}Y_{28.5}Zr_{1.5}$. As to the magnetic material, the amount of change of magnetic entropy $\Delta S$ was evaluated. Table 1 shows a result of measurement.

Comparative Example 4

In a comparative example 4, a magnetic material was created likewise the example 1 except that it had a composition formula of $Gd_{97}Y_3$. As to the magnetic material, the temperature dependence of a magnetization curve was measured. Tables 2 and 3 show a result of measurement.

Comparative Example 5

In a comparative example 5, a magnetic material was created likewise the example 1 except that it had a composition formula of $Gd_{93}Y_7$. Tables 2 and 3 show a result of measurement.

Comparative Example 6

In a comparative example 6, a magnetic material was created likewise the example 1 except that it had a composition formula of $Gd_{85}Y_{15}$. As to the magnetic material, the temperature dependence of a magnetization curve was measured. Table 3 shows a result of measurement.

TABLE 1

| | $T_{peak}$ (K) | $\Delta S_{max}$ (J/kg·K) | ½ $\Delta S_{max}$ Temperature Range (K) |
|---|---|---|---|
| Comparative Example 1: Gd | 295.4 | 3.58 | 29.5 |
| Comparative Example 3: $Gd_{70}(Y_{28.5}Zr_{1.5})$ | 218.9 | 2.62 | 40.6 |
| Example 1: $Gd_{99.8}Zr_{0.2}$ | 293.5 | 3.31 | 31.9 |
| Example 3: $Gd_{98.5}Zr_{1.5}$ | 289.2 | 3.30 | 33.5 |
| Example 4: $Gd_{97}Zr_3$ | 284.4 | 3.14 | 35.1 |
| Example 5: $Gd_{93}(Y_{5.5}Zr_{1.5})$ | 276.3 | 3.39 | 34.5 |
| Example 7: $Gd_{93}(Y_4Zr_3)$ | 275.5 | 3.20 | 35.1 |
| Example 8: $Gd_{85}(Y_{12}Zr_3)$ | 258.0 | 3.02 | 36.2 |

TABLE 2

| | $T_C$ (K) | $T_{SR}$ (K) | $T_C - T_{SR}$ (K) |
|---|---|---|---|
| Comparative Example 1: Gd | 294.0 | 230.0 | 64.0 |
| Comparative Example 2: $Gd_{90}Y_{10}$ | 274.0 | 251.0 | 23.0 |
| Comparative Example 4: $Gd_{97}Y_3$ | 288.2 | 239.0 | 49.2 |
| Comparative Example 5: $Gd_{93}Y_7$ | 281.1 | 248.0 | 33.1 |
| Example 1: $Gd_{99.8}Zr_{0.2}$ | 293.2 | 231.5 | 61.7 |
| Example 2: $Gd_{99.5}Zr_{0.5}$ | 292.5 | 234.0 | 58.5 |
| Example 3: $Gd_{98.5}Zr_{1.5}$ | 288.0 | 242.0 | 46.0 |
| Example 4: $Gd_{97}Zr_3$ | 283.5 | 252.0 | 31.5 |

TABLE 3

| | $T_C$ (K) | $T_{SR}$ (K) | $T_C - T_{SR}$ (K) | Difference from $T_C - T_{SR}$ of Gd (K) |
|---|---|---|---|---|
| Comparative Example 4: $Gd_{97}Y_3$ | 288.2 | 239.0 | 49.2 | 14.8 |
| Example 9: $Gd_{97}(Y_{1.5}Zr_{1.5})$ | 285.0 | 243.1 | 42.0 | 22 |
| Example 4: $Gd_{97}Zr_3$ | 283.5 | 252.0 | 31.5 | 32.5 |
| Comparative Example 5: $Gd_{93}Y_7$ | 281.1 | 248.0 | 33.1 | 30.9 |
| Example 5: $Gd_{93}(Y_{5.5}Zr_{1.5})$ | 277.5 | 252.2 | 25.3 | 38.7 |
| Example 7: $Gd_{93}(Y_4Zr_3)$ | 275.0 | 253.0 | 22.0 | 42 |
| Comparative Example 6: $Gd_{85}Y_{15}$ | 261.0 | 244.0 | 17.0 | 47 |
| Example 6: $Gd_{85}(Y_{13.5}Zr_{1.5})$ | 258.0 | 245.0 | 13.0 | 51 |

FIG. 6 is a view showing the temperature dependence of the amounts of change of magnetic entropy |ΔS| of the example 3 and the comparative example 1. As shown in FIG. 6, it can be found that a peak appears to each of the amounts of change of the magnetic entropy ΔS. Then, it can be found that the peak is changed to a shape having a tail extending to a low temperature side by adding Zr. As a result, as shown in Table 1, the temperature range of 1/2ΔS$_{max}$ of the example 3 becomes larger than that of the comparative example 1.

FIG. 7 is a view showing the temperature dependence of magnetization curves of the example 3 and the comparative example 1. As shown in FIG. 7, two peculiar points $T_c$ and $T_{SR}$ exist in each of the magnetization curves. In the comparative example 1, $T_c$ due to the ferromagnetic transition is $T_c$=294K, and $T_{SR}$ due to the spin realignment is $T_{SR}$=230K. In the example 3, the temperature interval between the two peculiar points is small as shown by $T_c$=288K and $T_{SR}$=242K.

As described in the embodiments, it is considered that the close temperature interval of $T_c$ and $T_{SR}$ found in FIG. 7 contributes to the difference between the shapes of the peaks found in FIG. 6 and to the expansion of the temperature range of 1/2ΔS$_{max}$ in the example 3.

Figure 8:
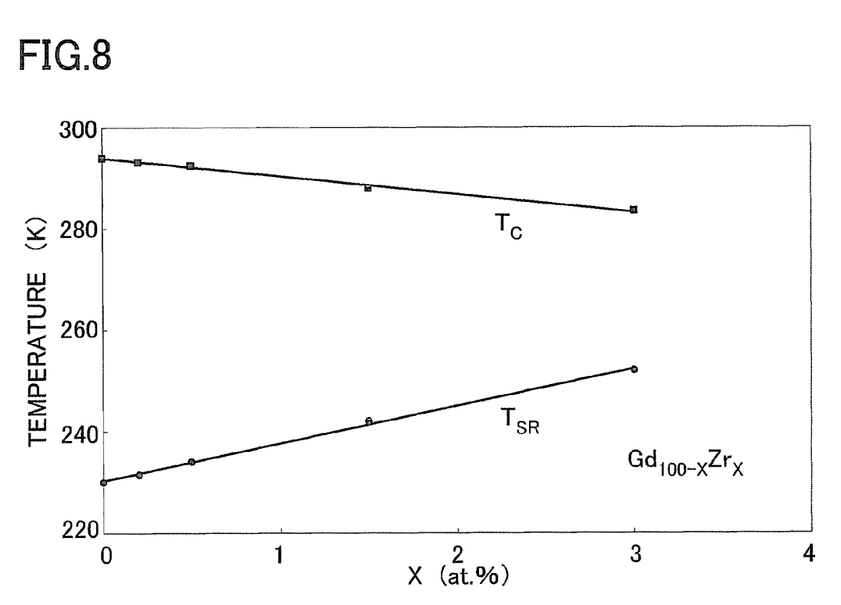
FIG. 8 is a view showing the Zr concentration dependence of $T_C$ and $T_{SR}$ determined from the temperature dependence of the magnetization curves of the examples 1 to 4 and the comparative example 1.

FIG. 8 is a view showing the Zr concentration dependence of $T_c$ and $T_{SR}$ determined from the temperature dependence of the magnetization curves of the examples 1 to 4 and the comparative example 1. As described above, it is found that the case, in which Zr is added in a larger amount, has a larger amount of change of $T_c$ and $T_{SR}$ than the case, in which Zr is not added to Gd, that is, has a smaller temperature interval between $T_c$ and $T_{SR}$.

As shown in Table 1, the temperature range of 1/2ΔS$_{max}$ is more expanded in the examples 1, 3, and 4 in which Zr is added than in the comparative example 1. In contrast, ΔS$_{max}$ exhibits a maximum value in the comparative example 1. When a magnetic refrigeration is executed using the magnetic material, since not only the magnitude of the amount of change of the magnetic entropy ΔS but also the temperature range in which the amount of change of the magnetic entropy ΔS appears, i.e., an effective temperature range are important factors, it can be said that the examples are also effective magnetic materials for magnetic refrigeration.

As shown in Table 2, it is admitted that the temperature interval ($T_c$-$T_{SR}$) between $T_c$ and $T_{SR}$ is more reduced by a decrease of $T_c$ and an increase of $T_{SR}$ in the examples 1 to 4, in which Zr is added, than in the comparative example 1. Note that the temperature interval between $T_c$ and $T_{SR}$ can be reduced even in the comparative example 2, 4, 5 in which only Y is added to Gd, the effect thereof is smaller than the case in which Gd is replaced with Zr as shown in Table 2.

When Gd is replaced by Y in the range of 0 to 10 at %, $T_c$ is decreased about 1.8K and $T_{SR}$ is increased about 2.4K each 1 at %. In contrast, when Gd is replaced by Zr, $T_c$ is decreased about 3.6K and $T_{SR}$ is increased about 7.9 K each 1 at % so that Zr can change the magnetic transition temperature more than Y.

Further, even if Gd is replaced by a combination of Y and Zr, the temperature interval between $T_c$ and $T_{SR}$ can be reduced and the temperature range showing 1/2ΔS$_{max}$ can be increased. As shown in Table 3 as to the examples 5 to 9, when Gd is replaced by the combination of Zr and Y, the temperature interval between $T_c$ and $T_{SR}$ can be reduced and a wide temperature range showing 1/2ΔS$_{max}$ can be obtained by a smaller replace amount of them to the Gd element as compared with the case in which only Y is added.

In addition, $T_c$ and $T_{SR}$ can be obtained in a wider temperature range by combining Zr and Y as compared with the case of adding only Zr. As a result, $T_c$ and $T_{SR}$ can be more easily designed.

When Gd is replaced by the combination of Zr and Y, the total replace amount of Gd is 7 at %, $T_c$ is 277.5K, and $T_{SR}$ is 252.2K as in the example 5. In the replacement of only Y, this change approximately corresponds to the comparative example 2 in which Gd of 10 at % is replaced. However, replacement of Gd in an excessively large total amount is not appropriate because the amplitude of ΔS itself is decreased as shown in Table 1 and the comparative example 3.

As described above, the effect of the present invention is confirmed by the examples.

What is claimed is:
1. A magnetic refrigeration apparatus comprising:
an AMR bed filled with a first magnetic material;
a magnetic field generation device configured to apply and remove a magnetic field to and from the first magnetic material;
a low temperature side heat exchanging unit configured to receive coldness from the AMR bed;

a high temperature side heat exchanging unit configured to receive heat from the AMR bed;

a heat transfer fluid path formed by connecting the AMR bed, the low temperature side heat exchanging unit, and the high temperature side heat exchanging unit for circulating a heat transfer fluid, wherein at least a part of the first magnetic material is formed of a magnetic material shown by a composition formula of $Gd_{100-x-y}Zr_xY_y$, wherein $0<x<3.4$ and $0 \leq y \leq 13.5$, and wherein the AMR bed has a low temperature end side and a high temperature end side, the low temperature side heat exchanging unit is disposed to the low temperature end side, the high temperature side heat exchanging unit is disposed to the high temperature end side, the low temperature end side is filled with the first magnetic material, and the high temperature end side is filled with a second magnetic material having a ferromagnetic transition temperature higher than that of the first magnetic material.

2. The apparatus according to claim 1, wherein the AMR bed is filled with the first magnetic material and the second magnetic material having composition different from the first magnetic material in a layered state.

3. The apparatus according to claim 2, wherein the first magnetic material and the second magnetic material are a number of substantially spherical magnetic particles having a maximum diameter of 0.3 mm or more to 2 mm or less.

4. A magnetic refrigeration system comprising:

a magnetic refrigeration apparatus having an AMR bed filled with a magnetic material, magnetic field generation device configured to apply and remove a magnetic field to and from the magnetic material, a low temperature side heat exchanging unit, a high temperature side heat exchanging unit, and a heat transfer fluid path formed by connecting the AMR bed, the low temperature side heat exchanging unit, and the high temperature side heat exchanging unit for circulating a heat transfer fluid, wherein at least a part of the magnetic material is formed of a magnetic material shown by a composition formula of $Gd_{100-x-y}Zr_xY_y$, wherein $0<x<3.4$ and $0 \leq y \leq 13.5$;

a cooling unit thermally connected to the low temperature side heat exchanging unit; and a heat discharge unit thermally connected to the high temperature side heat exchanging unit, wherein the low temperature side heat exchanging unit is composed of a low temperature bath for storing a low temperature refrigerant and a low temperature side heat exchanger disposed in the low temperature side bath so as to be in contact with the refrigerant.

5. The apparatus according to claim 1, wherein $0.2 \leq x \leq 3.0$.

6. The system according to claim 4, wherein $0.2 \leq x \leq 3.0$.

7. The apparatus according to claim 1, wherein a temperature of the first magnetic material at which a maximum peak appears to a change of amount of magnetic entropy is between 258.0 K and 293.5 K inclusive, and an absolute value of the change of amount of magnetic entropy of the first magnetic material at the temperature is between 3.02 J/(kg·K) and 3.31 J/(kg·K) inclusive.

8. The system according to claim 4, wherein a temperature of the magnetic material at which a maximum peak appears to a change of amount of magnetic entropy is between 258.0 K and 293.5 K inclusive, and an absolute value of the change of amount of magnetic entropy of the magnetic material at the temperature is between 3.02 J/(kg·K) and 3.31 J/(kg·K) inclusive.

9. The apparatus according to claim 1, wherein the second magnetic material is Gd.

10. The apparatus according to claim 2, further comprising a partition wall through which the refrigerant can pass, and filled in the layered state so that the first magnetic material and the second magnetic material are not mixed with each other.

11. The system according to claim 4, wherein the high temperature side heat exchanging unit is composed of a high temperature bath for storing a high temperature refrigerant and a high temperature side heat exchanger disposed in high temperature bath so as to be in contact with the refrigerant.

12. A magnetic refrigeration apparatus comprising:

an AMR bed filled with a first magnetic material;

a magnetic field generation device configured to apply and remove a magnetic field to and from the first magnetic material;

a low temperature side heat exchanging unit configured to receive coldness from the AMR bed;

a high temperature side heat exchanging unit configured to receive heat from the AMR bed; and a heat transfer fluid path formed by connecting the AMR bed, the low temperature side heat exchanging unit, and the high temperature side heat exchanging unit for circulating a heat transfer fluid, wherein at least a part of the first magnetic material is formed of a magnetic material shown by a composition formula of $Gd_{100-x-y}Zr_xY_y$, wherein $0<x<3.4$ and $0 \leq y \leq 13.5$, and wherein the AMR bed is filled with the first magnetic material and a second magnetic material having composition different from the first magnetic material after they are mixed with each other.

13. The apparatus according to claim 12, wherein the second magnetic material is Gd.

14. The apparatus according to claim 12, wherein the first magnetic material and the second magnetic material are a number of substantially spherical magnetic particles having a maximum diameter of 0.3 mm or more to 2 mm or less.

* * * * *